Patented Jan. 30, 1940

2,188,736

UNITED STATES PATENT OFFICE 2,188,736

METHOD OF COMPOUNDING LATEX AND PRODUCT THEREOF

Hubert F. Jordan, Nutley, N. J., assignor, by mesne assignments, to United States Rubber Company, New York, N. Y., a corporation of New Jersey No Drawing. Application April 2, 1938, Serial No. 199,601

16 Claims. (Cl. 260—746)

This invention relates to a method of compounding natural rubber latex with such compounding ingredients as zinc oxide, curatives, accelerators, stabilizers, fillers and the like.

The compounding of ammonia-preserved latex by the conventional procedure of adding the compounding materials to the latex in finely divided or dispersed form, as in the case of aqueous pastes, or dissolved in water, with or without the addition of protective colloids or stabilizers, has the decided disadvantage that compounds so produced are not sufficiently reproducible from one lot of latex to another for conventional manufacturing procedures. This is not surprising when we consider that the compositions of different commercial shipments of rubber latex must vary greatly due to the latex being a natural product and further by virtue of the variations in procedures for preparing and preserving the latex. When zinc oxide is one of the compounding ingredients, which is almost universally the case whenever a vulcanized product is the desideratum, we have in addition the tendency of the zinc oxide to destabilize the latex compound. As little as 1% of zinc oxide, referred to the solids content of ordinary ammonia-preserved latex, will thicken and oftentimes coagulate it, whereas 2% of zinc oxide is ordinarily considered the minimum required for good vulcanization with modern accelerators. Merely reducing or removing the ammonia from an ammonia-preserved latex by aerating or by the addition of formaldehyde before compounding with zinc oxide, will not eliminate the differences in the behavior of various batches of the same latex compound prepared from different lots of latex nor will it satisfactorily eliminate the destabilizing effect of the zinc oxide.

One object of the present invention is to compensate for the unavoidable differences between types or lots of ammonia-preserved latex when compounding the same, in order to give a more uniform compounded latex which will in turn give a more reproducible behavior during subsequent processing. Another object is to permit the preparation of latex compounds of constant properties, that is, with little or no drift upon storage, thus permitting large bulk preparation of compounds usable over extended periods which may be for several days, weeks, or months. A further object of the invention is to permit the compounding of latex with relatively high amounts of zinc oxide, for example, 2% to 10% or more referred to the solids content of the latex, without destabilization or coagulation, and with a minimum thickening and change of other properties on standing or in storage.

I have found that the differences in the properties of latex compounds of the same formulation but made from different lots of ammonia-preserved latex, that show up in manufacturing operations utilizing such latex compounds, are in the main the result of variations in the content of acidic materials and materials which are readily hydrolyzable to give substances of acid character in the different lots of latex, the latter being for the most part ammonium salts. The titratable acid content of different ammonia-preserved latices varies widely according to the previous history of the latex, and particularly with the degree of purification to which it may have been subjected, the titratable acid content decreasing with increased numbers of centrifuging or chemical creaming operations. I have found that in order to obtain truly reproducible compounds, these variations in the titratable acid contents of different latices must be compensated for in the compounding operation. This may be accomplished by adjusting to a predetermined common value the hydrogen ion concentration of the various lots of latex that it is desired to compound according to the same formulation and whose properties are desired to be the same. A very simple method of compensating for such variations in the titratable acid content is to add to the latex in the compounding operation a stronger base than ammonia in an amount equivalent to the titratable acid content of the latex, if, of course, such treatment does not otherwise destabilize the compound.

The destabilizing effect of zinc oxide in ammonia-preserved latex, as distinguished from the non-uniformity of compounds made from different lots of latex, is believed to be due to the presence of bivalent positive zinc ions resulting from the dissociation of the dissolved zinc oxide, whether these bivalent positive zinc ions are zinc ions ($Zn^{++}$) or bivalent zinc complex ions, such as zinc ammonia ions ($Zn(NH_3)_4^{++}$) and the like. Because of the low solubility of zinc oxide, a latex compound containing dispersed zinc oxide is inherently a solution saturated with respect to zinc oxide in equilibrium with solid zinc oxide. The amount of bivalent zinc ions and bivalent zinc complex ions present in the solution will be governed by chemical principles which are well established and known to apply to similar equilibria. For instance, in the absence of ammonia, the equilibria existing between solid zinc oxide and water are as follows:

$$OH^- \rightleftharpoons Zn^{++} + 2OH^- \quad (1)$$

Since only the concentration of bivalent zinc ion is of interest, (1) may be written:

The expression for the equilibrium constant is

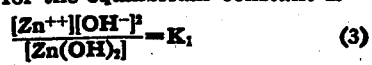

in which the bracketed expressions indicate concentrations of the solutes and $K_1$ is the corresponding ionization constant. Since the solution is saturated with respect to zinc hydroxide, the concentration of $Zn(OH)_2$ may be considered constant ($K_2$). Expression 3 then may be written $$[Zn^{++}][OH^-]^2 = K_1 K_2 = K_{sp} \quad (4)$$

$K_{sp}$ is commonly known as the solubility product. The above expression may be put in another form:

$$[Zn^{++}] = \frac{K_{sp}}{[OH^-]^2} = \frac{K_{sp}[H^+]^2}{K_w} = A[H^+]^2 \quad (5)$$

$K_w$ is the ionization constant of water.

Thus it is obvious that in the absence of ammonia the ultimate concentration of bivalent positive zinc ion varies directly as the square of the hydrogen ion concentration. An increase of one unit in pH will therefore decrease the bivalent zinc ion concentration one hundred fold.

In the presence of ammonia the preceding considerations will be altered somewhat. It is well known that in the presence of ammonia or mixtures of ammonia and ammonium salts the solubility of zinc oxide in water is increased greatly. This effect is believed to be due to the formation of complex zinc ammonia ions of the type $$[Zn(NH_3)_x^{++}]$$

in which $x$ represents the number of molecules of ammonia associated with each zinc complex ion. While the exact value of $x$ is not known with any certainty, it is believed that it lies between 1 and 4. For the present purpose a knowledge of the exact value of $x$ is unnecessary. With the assumption that the presence of ammonia will not change the concentration of $Zn(OH)_2$ to any measurable degree, Expression 2 may be rewritten as:

$$Zn(OH)_2 + x(NH_3) = Zn(NH_3)_x^{++} + 2OH^- \quad (6)$$

from which may be deduced the following relationship:

$$\frac{[Zn(NH_3)_x^{++}][OH^-]^2}{[Zn(OH)_2][NH_3]_x} = K_3 \quad (7)$$

in which the bracketed expressions indicate concentrations of the solutes and $K_3$ is the corresponding ionization constant. Expression 7 may be rewritten:

$$[Zn(NH_3)_x^{++}] = [H^+]^2[NH_3]^x \frac{K_2 K_3}{K_w} = B[H^+]^2[NH_3]^x \quad (8)$$

Combining (8) and (5) and simplifying slightly gives the expression for the total bivalent zinc ion concentration as:

$$[Zn^{++}] + [Zn(NH_3)_x^{++}] = [H^+]^2\{A + B[NH_3]^x\} \quad (9)$$

in which [NH₃] represents the concentration of the dissolved ammonia, which is of course a function of both the total ammonia concentration (i. e., $[NH_3] + [NH_4^+]$)

and the hydrogen ion concentration, and $[H^+]$ represents the hydrogen ion concentration which is related to pH by the expression $$pH = \log\frac{1}{[H^+]}$$

A and B are arbitrary constants characteristic of the system zinc oxide-ammonia-water for which exact values are not at present known. An examination of Equation 9 indicates that the total bivalent zinc ion at a given ammonia concentration varies directly with the square of the hydrogen ion concentration, but that the total bivalent zinc ion concentration at any given hydrogen ion concentration is affected very noticeably by the total ammonia concentration. Thus, in order to maintain the total bivalent zinc ion concentration below any predetermined value, it is necessary to control both the ammonia concentration and the hydrogen ion concentration.

Guided by the above considerations, I have discovered that if the ammonia content of an ammonia-preserved latex is reduced and kept below a certain limit, and if the pH of the same latex is raised and maintained above a certain limit as by the addition of a stronger base than ammonia, the addition of zinc oxide will not have the usual destabilizing effect on the latex compound. These limits I have found to be 0.25% of the weight of the water content of the latex compound as the upper limit for the total ammonia concentration, and 9.7 to 10 for the lower pH limit. I have found that the total ammonia content of the latex compound should not be over .25% of the weight of the water content of the compound, otherwise there may be enough zinc oxide dissolved to dissociate into sufficient bivalent zinc ions to effect destabilization of the latex compound even at pH's above 9.7 to 10.0 as described above. Since any ammonium ion present is converted largely into free ammonia in the presence of the added strong base, ammonia and ammonium ion are equivalent in the operation of the process of the invention, and the term "ammonia" is therefore to be construed in the specification and claims as including ammonium ion.

Considering the above, it is seen that in carrying out the present invention to produce a stable latex compound containing zinc oxide, the ammonia content of the latex compound should be adjusted to .25% by weight or less, referred to the water content of the compound, and the pH of the compound should be raised by a stronger base than ammonia to at least 9.7 to 10.0. When an alkali hydroxide is used to raise the pH, the lower limit of the pH of the compound may be 9.7. Where weaker bases than alkali hydroxides, but of course stronger bases than ammonia, such as certain amines as discussed below, are used to raise the pH, the lower limit of the pH of the compound should be 10.0. Even in the case of alkali hydroxides, it is preferable if the pH of the final compound is 10.0 or above. Merely reducing the ammonia content of a compounded ammonia-preserved latex to .25% or less by weight of the water content of the compound is not satisfactory as it will only give a pH of the latex on the order of 9.0–8.5 or less, and in this range the latex is very unstable, especially in the presence of zinc oxide, as explained above. Further, in order to make truly reproducible compounds, it is desirable to add in the compounding operation an amount of a stronger base than ammonia equivalent to the titratable acid content of the latex. Fortunately, these desired modifications of ammonia preserved latices in carrying out the present invention are not incompatible. I have found that if the ammonia content of a given latex is reduced to .25% by weight or below, referred to the water content, and an amount of alkali hydroxide exactly metathetically equivalent to the titratable acid content of the latex is added to the latex, the pH of the thus treated latex, due to the acidic materials in the latex, will lie between 10 and 11, and will generally be about 10.5. Thus, in the case of the strongest bases, the addition to the latex with reduced ammonia content of an amount of such base equivalent to the titratable acid content of the latex will automatically produce a compound having a pH above 9.7, the minimum necessary for producing a stable latex with alkali hydroxide in the presence of zinc oxide. On the other hand, I have found that when other bases which are weaker than alkali hydroxides, but of course stronger than ammonia, are added to the latex to raise the pH above 10.0, as above described, even a greater amount of such base must often be added than is equivalent to the titratable acid content of the latex in order to increase the pH to above 10.0, and hence in these cases raising the pH above 10.0 inherently adds at least an amount of base equivalent to the titratable acid content of the latex and hence automatically compensates for differences in various latices. I have further found that the pH of the latex compound should not be raised above 11.0, nor above 11.4 if the pH measurement is made on the freshly prepared compound whose pH has been raised by the addition of alkali hydroxide. The pH of a compound which is about 11.4 when freshly made generally drops on standing to around 11. With higher pH's the latex compound becomes destabilized and has other disadvantages described below. If the pH of the compound whose pH has been raised by alkali hydroxide is between 9.7 and 10.0, it should be used relatively soon after it is made, otherwise the mechanical stability of such a latex compound is apt to decrease on standing or the viscosity may increase. The preferred pH range of a latex compound prepared according to the present invention is thus from 10 to 11, but in the case of compounds whose pH's have been raised by the addition of an alkali hydroxide, the lower value of pH of 10 may be reduced to 9.7 if the compound is not to be stored for too long a time, and the upper value of pH of 11 may be increased to 11.4 if the pH measurement is made on the freshly prepared sample. The disadvantages that will arise from too low pH are that the compound will have a low mechanical stability, the viscosity of the latex compound may increase with time, and fine agglomerates may form in the latex, with probably complete coagulation ultimately taking place if the pH is, for example, below 9.0. The disadvantages which arise from too high pH are that the compound will have a low mechanical stability, will be too insensitive to coagulants and to heat, will have a tendency to cream, and in case the pH is raised by the addition of a fixed alkali, the latex will be slow drying and the alkali will have an adverse effect on the vulcanization of the rubber in the case of most organic accelerators.

Examples of bases that are stronger than ammonia and that may be used to raise the pH of the latex compound to above 9.7 are the alkali hydroxides. By the term "alkali metal hydroxide" as used herein is meant a strong base of a univalent metal or metalloid radical, of a strength as a base approximately equal to that of sodium hydroxide, as for example, sodium hydroxide, potassium hydroxide, lithium hydroxide, and the quaternary ammonium hydroxides. In the process of reducing the ammonia content of the ammonia-preserved latex and adding an alkali metal hydroxide to bring the pH of the latex compound within the pH range of 9.7 to 11, it is desirable to allow a small amount of the ammonia to remain in the latex, for example, an amount greater than that equivalent to .05% by weight of the water content of the compounded latex, in order to act as a buffer for variations in case small errors are made in the amount of alkali hydroxide added. The ammonia content of the compounded latex when the pH is raised by means of an alkali hydroxide should therefore preferably be adjusted to between .05 and .25% by weight, referred to the water content of the latex compound. Bases weaker than the alkali metal hydroxides act to a great extent as their own buffers and in these cases there is no particular advantage in leaving a small amount of ammonia in the latex. In using the alkali metal hydroxides, other than the quaternary ammonium hydroxides, to raise the pH of the compound, there is introduced into the latex a substance which may impart an undesirable alkaline character to the final rubber compound or which may leave in the final rubber compound an alkali-metal salt which might likewise be undesirable. If for these or other reasons, it is not desired to introduce such a fixed alkali hydroxide into the latex compound, other bases stronger than ammonia, but weaker than alkali hydroxides, and which are volatile and leave no residue, such as various organic bases, may be used. Many organic bases, however, are not satisfactory due to a strong destabilizing or coagulating effect on latex. I have found that certain amines which are stronger than ammonia and are capable of raising the pH of the latex to 10.0 or above are satisfactory. I have found that the amines capable of being utilized according to the present invention are the secondary and tertiary alkyl monoamines in which each hydrocarbon group attached to the nitrogen atom contains from one to three carbon atoms. Examples of such amines are dimethylamine, diethylamine, dipropylamine, methyl ethylamine, trimethylamine, triethylamine, tripropylamine, ethylmethylpropylamine, and methyldiethylamine. I have found that primary aliphatic monoamines exert a solubilizing action on zinc oxide in a manner similar to the action of ammonia. Aliphatic polyamines, whether primary, secondary, or tertiary have a marked coagulating effect on latex. Those secondary and tertiary aliphatic monoamines having more than three carbon atoms in any one chain have an undesirable destabilizing effect on the latex.

In compounding ammonia-preserved latex according to the present invention, the ammonia content is adjusted to a value of .25% or less by weight, referred to the water content of the final latex compound, and an amount of alkali metal hydroxide or secondary or tertiary alkyl monoamine in which each hydrocarbon group attached to the nitrogen atom contains from 1 to 3 carbon atoms, is added that will give the final compound a pH between 10 and 11. In cases where alkali hydroxides are used to raise the pH and the compound is to be used relatively soon after preparation, the pH may be as low as 9.7, and in those cases where alkali hydroxides are used to raise the pH and in which the pH is measured directly after compounding, the pH may be as high as 11.4. The compounding ingredients are added to the latex in the form of conventional aqueous pastes or suspensions, or, if water-soluble, in solution in water. The terms "latex" or "rubber latex" or "natural rubber latex" are used in the present specification to denote a latex obtained from a rubber tree, such as Hevea brasili-

*ensis*. The terms are intended to include a latex having a concentration of solids approximately the same as when it comes from the tree, or so-called latex of normal solids concentration, and also to include a latex the concentration of solids of which has been artificially raised, as by centrifuging and chemical creaming methods well-known in the art. By the term "ammonia-preserved latex" is meant any preserved latex containing over .05% by weight of free ammonia (referred to the water content of the latex), whether such ammonia is wholly or partially responsible for the preservation of the latex. It includes latex of normal solids concentration preserved with the usual 1 to 1.25% of ammonia (based on the weight of the latex), and latices concentrated by centrifuging and chemical creaming methods and which are often preserved with .5 to .7% of ammonia (based on the weight of the latex). In addition, the expression "ammonia-preserved latex" includes latices preserved by the addition of a small amount of formaldehyde to the fresh latex followed by the later addition of an excess of ammonia, and generally containing less free ammonia in the final latex than latex preserved with ammonia alone. When the pH of the latex compound is to be raised by means of an alkali hydroxide, the ammonia content of the final compound should preferably be between .05 and .25% by weight of the water content of the compound. The ammonia content of a latex preserved with the aid of an amount of ammonia in excess of .25% of the weight of the water content of the final compound, as is generally the case, may be reduced to the desired value by any one of the several methods now used to reduce ammonia and well known to those skilled in the art. Such methods include aeration, or repeated chemical creaming or centrifuging with dilution or washing between the creaming or centrifuging operations with water which does not contain ammonia, or treatment with a chemical (such as formaldehyde) which reacts with the ammonia to form a compound (hexamethylene tetramine in the case of ammonia) which will not decompose to give free ammonia in the presence of alkali hydroxide. The operations of adding the various compounding ingredients and the alkali hydroxide or amine to raise the pH to within the desired range, may be performed in any convenient manner. In raising the pH with alkali hydroxides, it is generally desirable to add at least a part of the alkali hydroxide before the formaldehyde is added or before the ammonia is removed by aeration, if aeration or reaction of the ammonia with formaldehyde is the method used to reduce the ammonia content to .25% or less by weight of the water content of the final latex compound. When it is desired to add a part of the amine before the formaldehyde, in cases in which the ammonia content of the latex is reduced by the addition of formaldehyde, the amine chosen should be a tertiary amine since secondary amines will react with formaldehyde and the added amine will thus be partially or wholly removed along with the ammonia. If the ammonia content of the latex is reduced by aeration, any amine used to raise the pH should be added after the aeration, due to loss of amine that would otherwise be incurred during the aerating operation. When creaming or centrifuging operations are used to reduce the ammonia content, these are preferably performed on the latex before addition of the alkali hydroxide or the amine so as to save loss of added ingredients. Some compounding ingredients may be added to the latex prior to reduction of the ammonia by aeration or the addition of formaldehyde, and prior to the addition of the alkali hydroxide or amine, but compounds which would have a tendency to coagulate the latex if added before the alkali hydroxide or amine, should, of course, be added only after addition to the latex of at least an amount of alkali hydroxide or amine which will prevent their coagulating the compound, or they should be mixed or reacted with such an amount of alkali hydroxide or amine before being added to the latex.

As has been discussed above, the addition of alkali hydroxide or the desired secondary or tertiary amine to raise the pH to between 10 and 11, will compensate for differences in the titratable acid content of various latices. In thus raising the pH of the final compound to between 10 and 11, an amount of alkali hydroxide or amine that is equivalent to the titratable acid content of the compounding ingredients will also have been added. Examples of compounding ingredients which have a titratable acid content that is also automatically compensated for in raising the pH to the desired zone by the addition of alkali hydroxide or amine, are fatty acids, ammonium soaps, thiuram disulphides, mercaptobenzothiazole, the more readily hydrolyzable esters of mercaptobenzothiazole and of dithiocarbamic acids, phenols, water soluble phenol-formaldehyde resins, casein and glue. It has been seen above that when the ammonia content of the latex has been reduced to a value of .25% or less by weight, referred to the water content of the final latex compound, the addition of an amount of alkali hydroxide metathetically equivalent to the titratable acid content of the latex will automatically bring the pH within the range of 10 to 11, and generally around 10.5. This, of course, would be the case only in the absence of compounding materials which would have a titratable acid content of their own, such as those compounds enumerated immediately above. In such cases, however, the pH of the latex compound will be automatically raised to between 10 and 11 if there is added to the latex in addition to the amount of alkali hydroxide equivalent to the titratable acid content of the latex, an amount of alkali hydroxide equivalent to the titratable acid content of any compounding ingredients in the latex. In cases wherein alkali hydroxides are used to raise the pH of the latex to the desired range, the fact that the addition of an amount of alkali hydroxide equivalent to the titratable acid content of the latex plus the titratable acid content of the compounding ingredients will automatically bring the latex into the desired pH range, gives us an easy method of compounding the latex and we obtain a compound of the desired pH without the necessity for following the pH rise on addition of increments of the alkali hydroxide. In such cases it is only necessary, after the proper adjustment of the ammonia content, to add an amount of alkali hydroxide equivalent to the titratable acid content of the latex plus the titratable acid content of the compounding ingredients without determining the pH's of the latex compound as increments of the alkali hydroxide are added to the compound. With the amines, and of course if desired also with alkali hydroxides, the rise in pH is followed directly by measuring the pH after additions of increments of the amine or alkali hydroxide and stopping such additions after arriving at a pH value within the desired pH range.

When it is desired to empirically reach the desired pH range by merely adding an alkali hydroxide in amount equivalent to the titratable acid content of the latex plus the titratable acid content of the compounding ingredients, as explained above, the titratable acid content of the latex to be compounded may be determined by direct titration of a sample of the latex, and may be expressed in terms of the acid number of the latex. The "acid number" of a latex is numerically equal to the weight in grams of potassium hydroxide which is metathetically equivalent to the acidic material in an amount of latex containing 100 grams of latex solids. Any conventional titration method may be used, and details for such methods may be found in any standard text on electrometric or colorimetric methods. For example, in determining the acid number of the latex, the latex may be titrated with a standard KOH solution using electrometric methods, and using preferably the glass electrode, although the tungsten or antimony electrode may be used. Since the acidic materials may be titrated either as the free acids or as their ammonium salts, without materially affecting the results, the electrometric determinations may be run in the presence or absence of any or all of the ammonia. The methods of determining the end point in such electrometric titrations are very completely discussed in the literature, for example, in "Potentiometric Titrations", by Kolthoff and Furman (John Wiley, New York, 2nd ed. 1931). For example, the pH of the latex or the compounding material may be measured after the addition of each increment of standardized KOH solution and the pH plotted against the amount of KOH added. The end point of the titration would correspond to the point of maximum slope of the curve. Such titrations are conventional analytical procedures. The titratable acid content of the various compounding ingredients that are to be added to the latex may be determined in a similar manner, or may be calculated, if the necessary factors of composition, strength, purity, and so forth, are known. The titratable acid content of the various compounding ingredients may be expressed in terms of their "KOH equivalent." The KOH equivalent of the titratable acid content of a compounding material is numerically equal to the weight of potassium hydroxide which is metathetically equivalent to the acidic material contained in a given weight of the compounding material. In determining the "acid number" of the latex and the KOH equivalent of the titratable acid content of the compounding ingredients as above, I prefer to determine the pH values corresponding to the addition of each increment of the standardized KOH solution by means of the glass electrode using apparatus similar to that described in the article "Examination of Rubber Latex and Rubber Latex Compounds" by H. F. Jordan, P. D. Brass and C. P. Roe, analytical edition, Industrial and Engineering Chemistry, vol. 9, April 15, 1937, on pages 182-184. Likewise when it is desired to follow directly the rise in pH of the latex compound on addition of an amine, or an alkali hydroxide, the pH values after the addition of each increment of such amine or alkali hydroxide may similarly be obtained by means of the glass electrode, and the end point may be taken and the additions of amine or alkali hydroxide stopped when the desired pH has been reached.

The present invention is particularly useful in the compounding of concentrated latices in which there are wide variations of the titratable acid content due to the various concentrating methods used in addition to the natural variations in the latex and the variations imparted by the different preservation methods. In addition, in the case of concentrated latices, there is an increased tendency for the latex to become destabilized and to thicken in the presence of zinc oxide, even with the ammonia content reduced below .25% of the weight of the water content of the compound. While the invention is particularly useful in the compounding of concentrated latices, it is definitely of value in compounding latices of normal solids content to produce truly reproducible compounds, even though the tendency of the latex to become destabilized and to thicken in the presence of zinc oxide, where the ammonia content has been reduced below .25% of the weight of the water content, is less than in the case of concentrated latices. The term "concentrated latex" in the specification and claims is intended to refer to a latex having a solids content greater than 50%.

In the examples below are illustrated the principles of the present invention as applied to the compounding of various ammonia-preserved latices.

*Example I*

In this case, it was desired to compound a centrifuged latex with 1.5 parts sulphur, 3 parts zinc oxide, and 1 part accelerator per 100 parts latex solids (proportions by weight) to give a compound of 52% solids. The latex, prior to centrifuging, had been preserved by the addition of a small amount of formaldehyde followed by the addition of an excess of ammonia over that necessary to react with the residual formaldehyde. After centrifuging, further ammonia was added, and, as ready for compounding, the latex contained .55% ammonia, based on the weight of the latex, and had a total solids content of 62.2%. The acid number of the latex was .51. The accelerator was a commercial accelerator containing about 20% free mercaptobenzothiazole and 80% zinc salt of mercaptobenzothiazole. One gram of the accelerator contained titratable acidic material equivalent to .068 gram of potassium hydroxide. In other words, the KOH equivalent of the titratable acid content of each gram of the accelerator was .068 gram. The other compounding ingredients, sulphur and zinc oxide, in this and in the other examples, had no titratable acid contents.

In the preferred method of compounding the latex, there was added to the latex, on the basis of 100 parts latex solids, .6 part (dry basis) of potassium hydroxide as a 20% aqueous solution and 5.25 parts (wet basis) of a 37% aqueous solution of formaldehyde, followed by the sulphur, accelerator and zinc oxide in the form of conventional aqueous pastes, and finally the amount of water necessary to give the latex compound a total solids content of 52%. The formaldehyde reduced the ammonia content to a value of .15% of the weight of the water content of the compounded latex. The potassium hydroxide that was added was substantially equal to the acid number of the latex (.51) plus the KOH equivalent (.068) of the titratable acid content of the accelerator added. As discussed above, this amount of potassium hydroxide should give to the compound in which the ammonia content is .25% or less by weight of the water content of the compound, a pH between 10 and 11. As measured, the pH of the compound thus prepared was 10.7 when made and this value changed to 10.5 on standing at room temperature one week. As above suggested, the pH of the compound could have been directly measured on additions of increments of potassium hydroxide, and the additions stopped when the pH reached 10.5 or any value within the range of 9.7 to 11.4. The method of adding an amount of potassium hydroxide metathetically equivalent to the titratable acid contents of the latex and of the compounding ingredients has the advantage that once the acid number of a particular shipment of latex is known and the KOH equivalent of the titratable acid content of the compounding ingredients is known, the actual compounding of various lots of latex from that shipment to produce compounds of various formulations may be accomplished without further pH measurements, which means eliminating the taking of samples from each compound with each addition of potassium hydroxide and measuring the pH of the sample.

In order to compare the physical properties of the latex compounded as above according to the present invention with the same latex compound made with smaller and larger amounts of potassium hydroxide than are within the range that will give a pH of the final compound between 9.7 and 11.0, viscosity and mechanical stability measurements were made on the above latex compound prepared according to the present invention and on similar compounds containing smaller and larger amounts of potassium hydroxide added after reduction of the ammonia content and prior to the addition of the compounding pastes, as in the example above. The viscosity and mechanical stability measurements were made on the latex compounds immediately after compounding and after standing one week at room temperature. The results are given in the table below together with the amount of potassium hydroxide added and the pH of the latex compounds taken immediately after compounding and after standing one week at room temperature. Similar tables will be found in the other examples illustrating the invention. In all the examples, the measurements of pH, viscosity and mechanical stability were made in the same manner. The pH measurements were made using the glass electrode following the procedure described on pages 182–184 of the article "Examination of Rubber Latex and Rubber Latex Compounds" by H. F. Jordan, P. D. Brass and C. P. Roe, analytical edition, Industrial and Engineering Chemistry, vol. 9, April 15, 1937, pp. 182–189, referred to above. The viscosity measurements were made by the capillary flow method using a capillary viscometer as described on pages 185 to 187 of the article referred to above. The viscosity figures denoted in the following tables are "Limiting Viscosity" figures as discussed in that article. The mechanical stability measurements were made according to the procedure outlined on pages 188 and 189 of the above article using a motor speed of 15,000 revolutions per minute. Where the latex compounds in the mechanical stability tests had not coagulated in 15 minutes, the test was not continued to coagulation. In such cases the mechanical stability is recorded in the tables below as ">15" minutes, denoting a perfectly satisfactory mechanical stability of the compound. As a rule, a stability of at least about 7 minutes at 15,000 revolutions per minute is satisfactory for most purposes.

In the following table, the results of the tests on the compound made as above are given in column 1. In columns 2 and 3 are given the results of tests on the same compound prepared with amounts of potassium hydroxide which impart pH's below and above the pH range of 9.7 to 11.0.

|  | 1 | 2 | 3 |
|---|---|---|---|
| Latex solids............parts by weight... | 100 | 100 | 100 |
| Formaldehyde..........................do.... | 1.9 | 1.9 | 1.9 |
| Potassium hydroxide..................do.... | .6 | .2 | 1.0 |
| Sulphur..............................do.... | 1.5 | 1.5 | 1.5 |
| Accelerator..........................do.... | 1.0 | 1.0 | 1.0 |
| Zinc oxide...........................do.... | 3.0 | 3.0 | 3.0 |
| Water to total solids.............percent.. | 52 | 52 | 52 |
| pH as made................................ | 10.7 | 9.5 | 11.7 |
| pH after 1 week........................... | 10.5 | 9.4 | 11.4 |
| Viscosity as made.............centipoises.. | 16 | 16 | 16 |
| Viscosity after 1 week................do.... | 20 | 58 | 17 |
| Mechanical stability as made......minutes.. | >15 | 3 | 2 |
| Mechanical stability, after 1 week....do.... | >15 | 3 | 2 |

It will readily be observed from column 2 in the above table that the use of an insufficient amount of potassium hydroxide to raise the pH of the latex compound to at least 9.7 produces a latex compound which thickens considerably in a week as shown by the rise in viscosity. It may also be observed by comparing columns 2 and 3 with column 1 that the addition of smaller or greater amounts of potassium hydroxide than bring the pH of the latex compound within the desired range of 9.7 to 11.0 (11.4 when freshly prepared), give a much lower mechanical stability than the compound made according to the present invention, listed in column 1.

*Example II*

In this case, a centrifuged latex was to be compounded with 2.5 parts sulphur, 2.5 parts zinc oxide and .5 part zinc dibutyldithiocarbamate (accelerator) per 100 parts latex solids (proportions by weight) to give a compound of 55% solids. The latex had a total solids content of 63.9% and was preserved with ammonia alone, the ammonia content being .58%, based on the weight of the latex. The acid number of the latex was .78. The accelerator in this case had no titratable acid content.

In the preferred method of compounding this latex, there was added to the latex, on the basis of 100 parts latex solid, .8 part (dry basis) of potassium hydroxide as a 20% aqueous solution, and 5.5 parts (wet basis) of a 37% aqueous solution of formaldehyde, followed by the sulphur, accelerator and zinc oxide in the form of conventional aqueous pastes, and finally the amount of water necessary to give the latex compound a total solids content of 55%. The formaldehyde reduced the ammonia content to a value of .16% of the weight of the water content of the compounded latex. The potassium hydroxide that was added was approximately equivalent to the acid number of the latex (.78), it being unnecessary to add any additional potassium hydroxide for the compounding ingredients since none of them had any titratable acid content. By measurement, the pH of the latex as thus compounded was 10.9 when made and fell to 10.6 after standing at room temperature a week.

The following table compares the physical properties of the latex compound prepared as above (column 1) with latex compounds made with sufficiently smaller (column 2) and larger (column 3) amounts of potassium hydroxide to bring the pH of the compounds outside the desired pH range of 9.7 to 11.0.

|  | 1 | 2 | 3 |
|---|---|---|---|
| Latex solids_____parts by weight__ | 100 | 100 | 100 |
| Formaldehyde_____do____ | 2.0 | 2.0 | 2.0 |
| Potassium hydroxide_____do____ | .8 | .4 | 1.0 |
| Sulphur_____do____ | 2.5 | 2.5 | 2.5 |
| Accelerator_____do____ | .5 | .5 | .5 |
| Zinc oxide_____do____ | 2.5 | 2.5 | 2.5 |
| Water to total solids_____ | 55 | 55 | 55 |
| pH as made_____ | 10.9 | 9.6 | 11.7 |
| pH after 1 week_____ | 10.6 | (¹) | 11.1 |
| Viscosity as made_____centipoises__ | 19 | 18 | 21 |
| Viscosity after 1 week_____do____ | 28 | (¹) | 23 |
| Mechanical stability as made_____minutes__ | >15 | 3 | 2 |
| Mechanical stability after 1 week_____do____ | >15 | (¹) | 4 |

¹ Coagulated.

From the above table it will be seen that lowering the amount of potassium hydroxide to such an extent that the pH of the compound is below 9.7 produces in this case a latex so unstable that it coagulates within a week. Raising the amount of potassium hydroxide so that the pH of the compound is above 11.0 (11.4 as freshly prepared), reduces the mechanical stability of the compound to an unsatisfactory low figure.

*Example III*

In this case, a twice-creamed latex was to be compounded with 2.5 parts sulphur, 3 parts zinc oxide and 1.5 parts accelerator per 100 parts latex solids (proportions by weight) to give a compound of 54% solids. Prior to creaming, the latex had been preserved with a small amount of formaldehyde followed by the addition of an excess of ammonia over that necessary to react with the residual formaldehyde. The thus preserved latex was chemically creamed with a small amount of ammonium alginate in a known manner followed by dilution with water and a second creaming with alginate. The thus twice-creamed latex had a solids concentration of 65% and contained .15% ammonia based on the weight of the latex. The acid number of the latex was .36. The accelerator was the same accelerator used in Example I, each gram containing titratable acidic material equivalent to .068 gram of potassium hydroxide.

In the preferred method of compounding this latex, there was added to the latex, on the basis of 100 parts of latex solids, .46 part (dry basis) of potassium hydroxide as a 20% aqueous solution, and .7 part (wet basis) of a 37% aqueous solution of formaldehyde, followed by the sulphur, accelerator and zinc oxide in the form of conventional aqueous pastes, and finally the amount of water necessary to give the latex compound a total solids content of 54%. The formaldehyde adjusted the ammonia content to a value of .14% of the weight of the water content of the compounded latex. The potassium hydroxide added was approximately equivalent to the acid number of the latex (.36), plus the KOH equivalent (.10) of the titratable acid content of the accelerator added. The pH of the latex as thus compounded was 10.7 when made and fell to 10.6 after standing a week.

The following table gives a comparison of the physical properties of the latex compound prepared as above (column 1), and another latex compound within the pH range from 9.7 to 11.0 prepared with a different amount of potassium hydroxide (column 2), and a third compound whose pH was between 11.0 and 11.4 as freshly prepared (column 3), with a latex compound made with a sufficiently larger amount (column 4) of potassium hydroxide so that the pH of the compound when made was outside the range 9.7 to 11.4, and on standing remained outside the range 9.7 to 11.0.

|  | 1 | 2 | 3 | 4 |
|---|---|---|---|---|
| Latex solids,_____parts by weight__ | 100 | 100 | 100 | 100 |
| Formaldehyde_____do____ | .26 | .26 | .26 | .26 |
| Potassium hydroxide_____do____ | .46 | .42 | .58 | .9 |
| Sulphur_____do____ | 2.5 | 2.5 | 2.5 | 2.5 |
| Accelerator_____do____ | 1.5 | 1.5 | 1.5 | 1.5 |
| Zinc oxide_____do____ | 3.0 | 3.0 | 3.0 | 3.0 |
| Water to total solids_____per cent__ | 54 | 54 | 54 | 54 |
| pH as made_____ | 10.7 | 10.6 | 11.2 | 11.8 |
| pH after 1 week_____ | 10.6 | 10.5 | 10.9 | 11.7 |
| Viscosity as made_____centipoises__ | 16 | 16 | 15 | 16 |
| Viscosity after 1 week_____do____ | 21 | 23 | 19 | 22 |
| Mechanical stability as made_____minutes__ | >15 | 11 | >15 | 1 |
| Mechanical stability after 1 week_____do____ | >15 | >15 | >15 | 2 |

As may be seen from columns 1 and 2 of the above table, latices compounded according to the principles of the present invention and having a pH between 10 and 11 are satisfactory. This is true whether the amount of alkali hydroxide is equivalent to the titratable acid contents of the latex and the compounding ingredients as in column 1 or is slightly less than that amount as in column 2 so long as the pH is kept within the desired range. Column 3 shows a satisfactory latex, the pH of which was above 11.0 but not over 11.4 as made, but which dropped on standing a week to slightly below 11. The latex of column 4 with a pH which was above 11.4 when prepared, and which was still above 11.0 after standing a week, is unsatisfactory from a mechanical stability standpoint.

*Example IV*

In this case, a normal latex was to be compounded with 1.5 parts sulphur, 3 parts zinc oxide, and 1 part mercaptobenzothiazole (accelerator) per 100 parts latex solids (proportions by weight) to give a compound of 35% solids. The latex had been preserved by addition to the fresh latex of a small amount of formaldehyde followed by the addition of an excess of ammonia over that necessary to react with the residual formaldehyde. The latex had a solids content of 38.2% and contained .72% ammonia based on the weight of the latex. The acid number of the latex was 1.96. Each gram of the mercaptobenzothiazole accelerator used contained titratable acidic material equivalent to .34 gram of potassium hydroxide.

In the preferred method of compounding this latex according to the present invention, there was added to the latex, on the basis of 100 parts latex solids, 2.3 parts (dry basis) of potassium hydroxide as a 20% aqueous solution, and 12.5 parts (wet basis) of a 37% aqueous solution of formaldehyde, followed by the sulphur, accelerator and zinc oxide in the form of conventional pastes, and finally the amount of water necessary to give the latex compound a total solids of 35%. The formaldehyde adjusted the ammonia content to .07% of the weight of the water content of the compounded latex. The potassium hydroxide added was approximately equivalent to the acid number of the latex (1.96), plus the KOH equivalent (.34) of the titratable acid content of the accelerator added. The pH of the latex as thus compounded was 10.8 when made, and fell to 10.7 on standing a week.

The following table gives a comparison of the latex compound prepared as above (column 1), and a latex compound prepared with a different amount of potassium hydroxide but which still kept the pH of the compounded latex in the range from 9.7 to 11.0 (column 2), with a latex compound made with a sufficiently larger amount (column 3) of potassium hydroxide so that the pH of the latex compound was brought outside the range 9.7 to 11.0.

|  | 1 | 2 | 3 |
|---|---|---|---|
| Latex solids_____parts by weight__ | 100 | 100 | 100 |
| Formaldehyde_____do____ | 4.6 | 4.6 | 4.6 |
| Potassium hydroxide_____do____ | 2.3 | 1.5 | 3.0 |
| Sulphur_____do____ | 1.5 | 1.5 | 1.5 |
| Accelerator_____do____ | 1.0 | 1.0 | 1.0 |
| Zinc oxide_____do____ | 3.0 | 3.0 | 3.0 |
| Water to total solids_____per cent__ | 35 | 35 | 35 |
| pH as made_____ | 10.8 | 9.9 | 11.7 |
| pH after 1 week_____ | 10.7 | 9.8 | 11.5 |
| Viscosity as made_____centipoises__ | 6 | 5 | 7 |
| Viscosity after 1 week_____do____ | 6 | 8 | 6 |
| Mechanical stability as made____minutes__ | >15 | >15 | 6 |
| Mechanical stability after 1 week_____do____ | >15 | >15 | 4 |

As may be seen from columns 1 and 2 of the above table, latices compounded according to the principles of the present invention and having different pH's but within the range 9.7 to 11.0 are satisfactory. This is true whether the amount of alkali hydroxide is equivalent to the titratable acid contents of the latex and the compounding ingredients as in column 1, or is less than that amount as in column 2, so long as the pH is kept within the desired range. When, as in column 3, the potassium hydroxide is in an amount too large to bring the pH of the compound within the range 9.7 to 11.0 (11.4 as freshly prepared), the mechanical stability drops to an unsatisfactorily low value for many uses. While the differences in physical properties between latices compounded according to the present invention and those compounded with too small or too large amounts of potassium hydroxide may not be as marked in the case of normal latex as in the case of concentrated latex, the present invention is definitely of value in compounding normal latex for the preparation of reproducible latex compounds with identical behaviors in processing operations.

*Example V*

In this case, it was desired to compound a centrifuged latex with 4 parts sulphur, 2.5 parts zinc oxide, 0.25 part antioxidant, .5 part accelerator and 18 parts of a partially polymerized water soluble resorcinol-formaldehyde resin per 100 parts latex solids (proportions by weight) to give a compound of 20% solids. The latex used was the same as that used in Example I and had a total solids content of 62.2%, an acid number of .51, and contained .55% of ammonia, based on the weight of the latex. The accelerator used was mercaptobenzothiazole, one gram of which contained titratable acid material equivalent to .34 gram of potassium hydroxide. The anti-oxidant had no titratable acid content. The water soluble resorcinol-formaldehyde resin was made by dissolving 10 grams of technical grade resorcinol in 167 grams of water and adding thereto 1.4 grams of a 20% aqueous solution of potassium hydroxide and 21.6 grams of a 37% aqueous solution of formaldehyde. This solution was allowed to stand seventeen hours at 25° C. or until the reaction between resorcinol and formaldehyde had proceeded to a stage just short of gelation. The potassium hydroxide used with this resin solution functions as an alkaline catalyst for the resinification, and the rate at which gelation will occur, and hence the length of time during which the resin solution may be allowed to stand, will vary with the amount of base added, the relative proportions of resorcinol and formaldehyde, and the temperature.

In the preferred method of compounding this latex, there was added to the latex, on the basis of 100 parts latex solids, 1.5 parts (dry basis) of potassium hydroxide as a 20% aqueous solution and 200 grams of water followed by the sulphur, accelerator, antioxidant and zinc oxide, together with 1 part (dry basis) potassium oleate and sufficient water to bring the total solids to 25%. To this compound was added with careful stirring 200 grams of the resin solution made as described previously. The amount of potassium hydroxide added (i. e., 1.5 grams+0.28 gram) was sufficient to maintain the pH of the compound in the range 10 to 11, and the proper amount was determined by adding increments of standard potassium hydroxide to a sample of this compound and measuring the pH of the compound after the addition of each increment of base. The resin solution as made contained sufficient formaldehyde in excess of that required to react with the resorcinol present to react with all of the ammonia present in the latex, and hence the ammonia content was automatically reduced below the upper limit of .25% of the water content of the compound. The pH of the latex as thus compounded was 10.1 when made, and fell to 10. after standing one week at room temperature. This compound is especially suited for treating rayon textiles for the purpose of improving the adhesion between such textiles and rubber.

The following table gives a comparison of the physical properties of the latex compound prepared as above (column 1) and of latex compounds prepared with lesser amounts (columns 2 and 3) of potassium hydroxide to bring the pH of the compound below 9.7.

|  | 1 | 2 | 3 |
|---|---|---|---|
| Latex solids_____parts by weight__ | 100 | 100 | 100 |
| Potassium hydroxide_____do____ | 1.5 | .42 | .14 |
| Potassium oleate_____do____ | 1 | 1 | 1 |
| Sulphur_____do____ | 4 | 4 | 4 |
| Antioxidant_____do____ | .25 | .25 | .25 |
| Accelerator_____do____ | .5 | .5 | .5 |
| Zinc oxide_____do____ | 2.5 | 2.5 | 2.5 |
| Water to total solids_____percent__ | 25 | 25 | 25 |
| Resorcinol_____parts by weight__ | 10 | 10 | 10 |
| Potassium hydroxide_____do____ | .28 | .28 | .28 |
| Formaldehyde_____do____ | 8 | 8 | 8 |
| Water to total solids_____percent__ | 9 | 9 | 9 |
| Total KOH present in compound_____ | 1.78 | 0.70 | 0.42 |
| pH as made_____ | 10.1 | 8.7 | (¹) |
| pH after 1 week_____ | 10.0 | 8.7 | (¹) |
| Viscosity as made_____centipoises__ | 5 | 6 | (¹) |
| Viscosity after 1 week_____do____ | 5 | 12 | (¹) |
| Mechanical stability as made____minutes__ | >15 | 1 | (¹) |
| Mechanical stability after 1 week_____do____ | >15 | 3 | (¹) |

¹ Coagulated.

As may be seen from column 1 of the table, a latex compounded according to the principles of the present invention and having a pH between 10 and 11 is perfectly satisfactory whereas the compound in column 2, containing less than the proper amount of potassium hydroxide and having a pH below 9.7 shows a somewhat higher viscosity, greater tendency toward thickening on storage and an undesirably low mechanical stability, and the compound in column 3, containing a still smaller amount of fixed alkali, was so unstable that it coagulated before any measurements could be made.

In the following examples, amines were used to bring the latex compounds into the desired pH range of 10 to 11. In the case of amines, the disadvantages that arise from the use of too much amine are not such as to lend themselves to quantitative expression or measurements. Increasing the pH with amines above 11 is unsatisfactory, however, as it tends to give a slow drying compound, and to make it too insensitive to coagulation so that in utilizing such latex compounds in processes depending on the coagulation of a film of latex, as in dipping processes, there is a tendency to get surface slippage due to poor coagulation.

Example VI

In this case, it was desired to compound a newly prepared thrice creamed ammonia preserved latex with 2 parts sulphur, 3 parts zinc oxide and .5 part accelerator per 100 parts latex solids (proportions by weight) to give a latex compound of 58% total solids and free from fixed alkali. The latex used had a total solids content of 62.5%, and contained 0.1% of ammonia, based on the weight of the latex. The acid number of the latex was .20. The accelerator used contained no titratable acidic material. The amine used was trimethylamine—1.05 grams of which are equivalent to 1 gram of KOH.

In the preferred method of compounding this latex, there was added to the latex on the basis of 100 parts latex solids 0.70 gram of trimethylamine (dry basis) as a 10% aqueous solution, followed by the sulphur, accelerator and zinc oxide as standard aqueous pastes, together with sufficient water to bring the total solids of the compound to 58%. As made, the compound had a pH of 10.4, which value dropped after three weeks storage at room temperature to 10.3.

The following table gives a comparison of the physical properties of the latex compound prepared as above (column 1) with a latex compound prepared with a lesser amount of trimethylamine (column 2) than is necessary to raise the pH to 10.

| | 1 | 2 |
|---|---|---|
| Latex solids_____parts by weight__ | 100 | 100 |
| Trimethylamine_____do____ | .70 | .11 |
| Sulphur_____do____ | 2 | 2 |
| Accelerator_____do____ | .5 | .5 |
| Zinc oxide_____do____ | 3 | 3 |
| Water to total solids_____percent__ | 58 | 58 |
| pH as made_____ | 10.4 | 9.9 |
| pH after 3 weeks_____ | 10.2 | 9.6 |
| Viscosity as made_____ | 32 | 32 |
| Viscosity after 3 weeks_____ | 41 | 28 |
| Mechanical stability as made___minutes__ | >15 | 4 |
| Mechanical stability after 3 weeks__do__ | >15 | .3 |

As may be seen from column 1 of the table, a latex compounded according to the principles of the present invention, containing trimethylamine and having a pH between 10 and 11 is perfectly satisfactory, whereas the compound in column 2, containing less than the proper amount of trimethylamine and having a pH below 10, shows an unsatisfactory low mechanical stability on compounding and a still lower mechanical stability after storage for three weeks.

Example VII

In this case, the latex of Example VI was to be compounded with 2 parts sulphur, 3 parts zinc oxide and 1 part mercaptobenzothiazole (accelerator) per 100 parts latex solids (proportions by weight) to give a latex compound of 58% total solids and free from fixed alkali. Each gram of the mercaptobenzothiazole accelerator, as stated in Example IV, contained titratable acid material equivalent to .34 gram of potassium hydroxide.

The base used was triethylamine, 1.81 grams of which are equivalent to 1 gram of KOH.

In the preferred method of compounding this latex, there was added to the latex, on the basis of 100 parts of latex solids, 1.23 grams of triethylamine (dry basis) in the form of a 10% aqueous solution, followed by the sulphur, accelerator and zinc oxide in the form of conventional aqueous pastes, and sufficient water to bring the total solids of the compound to 58%. The compound as made had a pH of 10.4 which dropped after storage for three weeks at room temperature to 10.1. The viscosity on compounding was 26 centipoises, and after the three weeks storage at room temperature the viscosity was 33 centipoises. The mechanical stability on compounding and after three weeks storage was in excess of 15 minutes. Similar compounds made containing less triethylamine than necessary to bring the pH of the final compound within the range of 10 to 11 have undesirably low mechanical stabilities, parallel to the behavior of the trimethylamine compound in Example VI with pH below 10.

Example VIII

In this case, it was desired to compound a three times creamed ammonia preserved latex with 1.5 parts sulphur, 3 parts zinc oxide, .5 part accelerator per 100 parts of latex solids (proportions by weight) to give a latex compound of 55% total solids and free from fixed alkali. The latex used had a total solids content of 62.0%, and an ammonia content of 0.54%, based on the weight of the latex. The acid number of the latex was .25. The accelerator contained no titratable acidic material. The amine used was dimethylamine, .805 gram of which is equivalent to 1 gram of KOH.

In the preferred method of compounding this latex, there was added to the latex on the basis of 100 parts latex solids .3 gram of dimethylamine in the form of a 5% aqueous solution, followed by the sulphur, accelerator and zinc oxide in the form of conventional aqueous pastes, and finally by an amount of water sufficient to bring the total solids of the compound to 55%. The compound as made had a pH of 10.3 which dropped after standing one week at room temperature to 10.1.

The following table gives a comparison of the physical properties of the latex compound prepared as above (column 1) with another latex compound in the pH range of 10 to 11 (column 2) and with latex compounds containing insufficient amounts of dimethylamine to give pH's of 10 (columns 3 and 4).

| | 1 | 2 | 3 | 4 |
|---|---|---|---|---|
| Latex solids_____parts by weight__ | 100 | 100 | 100 | 100 |
| Dimethylamine_____do____ | .3 | .5 | .05 | .1 |
| Sulphur_____do____ | 1.5 | 1.5 | 1.5 | 1.5 |
| Accelerator_____do____ | .5 | .5 | .5 | .5 |
| Zinc oxide_____do____ | 3 | 3 | 3 | 3 |
| Water to total solids_____percent__ | 55 | 55 | 55 | 55 |
| pH as made_____ | 10.3 | 10.7 | 9.3 | 9.6 |
| pH after 1 week_____ | 10.1 | 10.7 | 9.2 | 9.5 |
| Viscosity as made_____centipoises__ | 31 | 32 | 29 | 29 |
| Viscosity after 1 week_____do__ | 31 | 29 | 28 | 27 |
| Mechanical stability as made__minutes__ | >15 | >15 | 1 | 2 |
| Mechanical stability after 1 week__do__ | >7 | >15 | 1 | 1 |

As may be seen from columns 1 and 2 of the table, latex compounds prepared according to the principles of the present invention and containing sufficient dimethylamine to bring the pH of the latex compound in the range from 10 to 11 are satisfactory, whereas the compounds, as in columns 3 and 4, containing less than the proper amount of dimethylamine and having pH's below 10 are unsatisfactory, due to low mechanical stability.

*Example IX*

In this case, a three times creamed latex was to be compounded with 2 parts sulphur, 3 parts zinc oxide, and 1 part accelerator per 100 parts of latex solids (proportions by weight) to give a latex compound free from fixed alkali and having a total solids content of 58%. The latex used was the same as that used in Examples VI and VII and had a total solids content of 62.5%, an ammonia content of .1%, based on the weight of the latex, and an acid number of .20. The accelerator used was mercaptobenzothiazole, 1 gram of which contains titratable acid material equivalent to .34 gram of KOH. The amine used was diethylamine, 1.30 grams of which are equivalent to 1 gram of KOH.

In the preferred method of compounding this latex, there was added to the latex on the basis of 100 parts latex solids, .76 gram diethylamine as a 10% aqueous solution, followed by the sulphur, accelerator and zinc oxide, in the form of conventional aqueous pastes, and finally sufficient water to bring the total solids content of the compound to 58%. The pH of the compound as made was 10.5 and after three weeks storage at room temperature this value had dropped to 10.1. The viscosity as made was 32 centipoises, and after two weeks storage at room temperature the viscosity was 40 centipoises. The mechanical stability as prepared was 8 minutes and after storage for three weeks at room temperature was in excess of 15 minutes. Similar compounds made containing less diethylamine than necessary to bring the pH of the final compound within the range of 10 to 11 have undesirably low mechanical stabilities, parallel to behavior of the dimethylamine compounds in Example VIII with pH's below 10.

It may be readily seen that the present invention enables one to eliminate the unavoidable differences between different lots or types of ammonia-preserved latices, and to thus provide a more uniform compounded latex which will give a more reproducible behavior during subsequent processing. The present invention also permits the preparation of latex compounds of constant properties. Also, this method of treating the latex renders the compounds stable in bulk and stable towards zinc oxide, and provides a compounded latex which shows little or no change in viscosity or other physical properties on storage. Furthermore, the present method gives a compounded latex which, while sufficiently stable in bulk, is not too stable towards the usual coagulants, and thus this method of treatment gives a compound which is more uniform as to its rate of deposition in processes involving coagulation.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of compounding an ammonia-preserved natural rubber latex which comprises adjusting the ammonia content to a value up to .25% by weight of the water content of the compounded latex, and adding to the latex compounding ingredients, and a base selected from the group consisting of alkali metal hydroxides and secondary and tertiary alkyl mono-amines in which each hydrocarbon group attached to the nitrogen atom contains from one to three carbon atoms, in an amount which brings the pH of the compounded latex to a value between 10 and 11.

2. The method of compounding an ammonia-preserved natural rubber latex which comprises adjusting the ammonia content to a value up to .25% by weight of the water content of the compounded latex, and adding to the latex compounding ingredients and a secondary alkyl mono-amine in which each hydrocarbon group attached to the nitrogen atom contains from one to three carbon atoms, in an amount which brings the pH of the compounded latex to a value between 10 and 11.

3. The method of compounding an ammonia-preserved natural rubber latex which comprises adjusting the ammonia content to a value up to .25% by weight of the water content of the compounded latex, and adding to the latex compounding ingredients, and a tertiary alkyl mono-amine in which each hydrocarbon group attached to the nitrogen atom contains from one to three carbon atoms, in an amount which brings the pH of the compounded latex to a value between 10 and 11.

4. The method of compounding an ammonia-preserved natural rubber latex which comprises adjusting the ammonia content to a value up to .25% by weight of the water content of the compounded latex, and adding to the latex compounding ingredients, and an alkali metal hydroxide in an amount which brings the pH of the compound to a value between 9.7 and 11.4.

5. The method of compounding an ammonia-preserved natural rubber latex which comprises adjusting the ammonia content to a value up to .25% by weight of the water content of the compounded latex, and adding to the latex compounding ingredients including zinc oxide, and a base selected from the group consisting of alkali metal hydroxides and secondary and tertiary alkyl mono-amines in which each hydrocarbon group attached to the nitrogen atom contains from one to three carbon atoms, in an amount which brings the pH of the compounded latex to a value between 10 and 11.

6. The method of compounding an ammonia-preserved natural rubber latex which comprises adjusting the ammonia content to a value of .05% to .25% by weight of the water content of the compounded latex, and adding to the latex compounding ingredients including zinc oxide, and alkali metal hydroxide in an amount which brings the pH of the compound to a value between 10 and 11.

7. A compounded natural rubber latex having a pH in the range from 10 to 11, and containing not more than .25% by weight of ammonia, referred to the water content of the latex compound, and containing a base selected from the group consisting of alkali metal hydroxides and secondary and tertiary alkyl mono-amines in which each hydrocarbon group attached to the nitrogen atom contains from one to three carbon atoms.

8. A compounded natural rubber latex having a pH in the range from 9.7 to 11, and containing an alkali metal hydroxide, and not more than .25% by weight of ammonia, referred to the water content of the latex compound.

9. A compounded natural rubber latex having a pH in the range from 9.7 to 11, and containing potassium hydroxide and zinc oxide, and .05% to .25% by weight of ammonia, referred to the the water content of the latex compound.

10. A compounded natural rubber latex having a pH when compounded in the range from 10 to 11.4, and containing an alkali metal hydroxide and zinc oxide, and .05% to .25% by weight of ammonia, referred to the water content of the latex compound.

11. A compounded natural rubber latex having a pH in the range from 10 to 11, and containing not more than .25% by weight of ammonia, referred to the water content of the latex compound, and containing a secondary alkyl mono-amine in which each hydrocarbon group attached to the nitrogen atom contains from one to three carbon atoms.

12. A compounded natural rubber latex having a pH in the range from 10 to 11, and containing not more than .25% by weight of ammonia, referred to the water content of the latex compound, and containing a tertiary alkyl mono-amine in which each hydrocarbon group attached to the nitrogen atom contains from one to three carbon atoms.

13. A concentrated compounded natural rubber latex having a pH in the range from 10 to 11, and containing not more than .25% by weight of ammonia, referred to the water content of the latex compound, and containing a base selected from the group consisting of alkali metal hydroxides, and secondary and tertiary alkyl mono-amines in which each hydrocarbon group attached to the nitrogen atom contains from one to three carbon atoms.

14. A concentrated compounded natural rubber latex having a pH in the range from 9.7 to 11, and containing an alkali metal hydroxide and zinc oxide, and .05% to .25% by weight of ammonia, referred to the water content of the latex compound.

15. A compounded natural rubber latex having a pH in the range from 10 to 11, and containing a water soluble condensation product of a polyhydroxy phenol and formaldehyde, and containing an alkali metal hydroxide and not more than .25% of ammonia, referred to the water content of the latex compound.

16. A concentrated compounded natural rubber latex having a pH in the range from 9.7 to 11 and containing a water-soluble condensation product of a polyhydroxy phenol and formaldehyde, and containing an alkali metal hydroxide and zinc oxide, and not more than .25% by weight of ammonia, referred to the water content of the latex compound.

HUBERT F. JORDAN.